(12) United States Patent
Poghosyan

(10) Patent No.: US 8,909,134 B2
(45) Date of Patent: Dec. 9, 2014

(54) RELAY WITH EFFICIENT SERVICE ROAMING HANDLING

(75) Inventor: Areg Poghosyan, Kitchener (CA)

(73) Assignee: Blackberry Limited, Waterloo, Ontario (CA)

( * ) Notice: Subject to any disclaimer, the term of this patent is extended or adjusted under 35 U.S.C. 154(b) by 186 days.

(21) Appl. No.: 13/592,760

(22) Filed: Aug. 23, 2012

(65) Prior Publication Data

US 2014/0057552 A1 Feb. 27, 2014

(51) Int. Cl.
*H04B 7/185* (2006.01)
(52) U.S. Cl.
USPC ............. 455/13.1; 455/432.1; 455/553.1
(58) Field of Classification Search
CPC ........... H04W 8/12; H04W 8/06; H04W 8/04; H04W 88/04
USPC .......... 455/422.1, 427, 428, 432.1, 433, 11.1, 455/12.1, 13.1, 550.1, 552.1, 553.1
See application file for complete search history.

(56) References Cited

U.S. PATENT DOCUMENTS

| | | | |
|---|---|---|---|
| 6,173,312 B1 | 1/2001 | Atarashi et al. | |
| 6,654,361 B1 * | 11/2003 | Dommety et al. | 370/331 |
| 8,548,454 B2 | 10/2013 | Schrader et al. | |
| 2005/0232188 A1 | 10/2005 | Sakamoto et al. | |
| 2008/0037553 A1 | 2/2008 | Gilmartin et al. | |
| 2012/0196632 A1 | 8/2012 | Smith et al. | |
| 2012/0252444 A1 * | 10/2012 | Pan | 455/433 |
| 2013/0064075 A1 | 3/2013 | Pu | |
| 2013/0095786 A1 * | 4/2013 | Bradburn | 455/406 |
| 2014/0029546 A1 | 1/2014 | Schrader et al. | |
| 2014/0043968 A1 | 2/2014 | Simen et al. | |

FOREIGN PATENT DOCUMENTS

| | | |
|---|---|---|
| EP | 2485443 A1 | 8/2012 |
| EP | 2560325 A1 | 2/2013 |

OTHER PUBLICATIONS

Akyol B A Etal: "Rerouting for Handoff in a Wireless ATM Network", IEEE Personal Communications, IEEE Communications Society, US, vol. 3, No. 5, Oct. 1, 1996, pp. 26-33, XP000617177, ISSN: 1070-9916, DOI: 10.1109/98.542235.
European Patent Application No. 12181608.6 Search Report dated Dec. 14, 2012.
Related European Patent Application No. 12181605.2 European Search Report dated Jan. 30, 2013.

* cited by examiner

*Primary Examiner* — Nhan Le
(74) *Attorney, Agent, or Firm* — Perry + Currier, Inc.

(57) ABSTRACT

A relay device and system with efficient service roaming handling, and methods there for, are provided. The relay device comprises: a processor; a communication interface for communicating with at least a first relay and a second relay, the first relay for relaying messages to a service device; and, a plurality of connection objects, including at least a first connection object for relaying first messages to the first relay and a second connection object for relaying second messages to the second relay, the processor enabled to: receive a service roaming indication that the service device has roamed from the first relay to the second relay; and, in response, communicate only with the first connection object to reroute the first messages associated with the service device to the second relay.

15 Claims, 13 Drawing Sheets

RELAY WITH EFFICIENT SERVICE ROAMING HANDLING

FIELD

The specification relates generally to relay devices, and specifically to a relay device and system with efficient service roaming handling, and methods there for.

BACKGROUND

When services roam in a communication network, relays (including routers and the like) in the communication network apply the service roaming when communicating with all other relays with which they are communicating.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
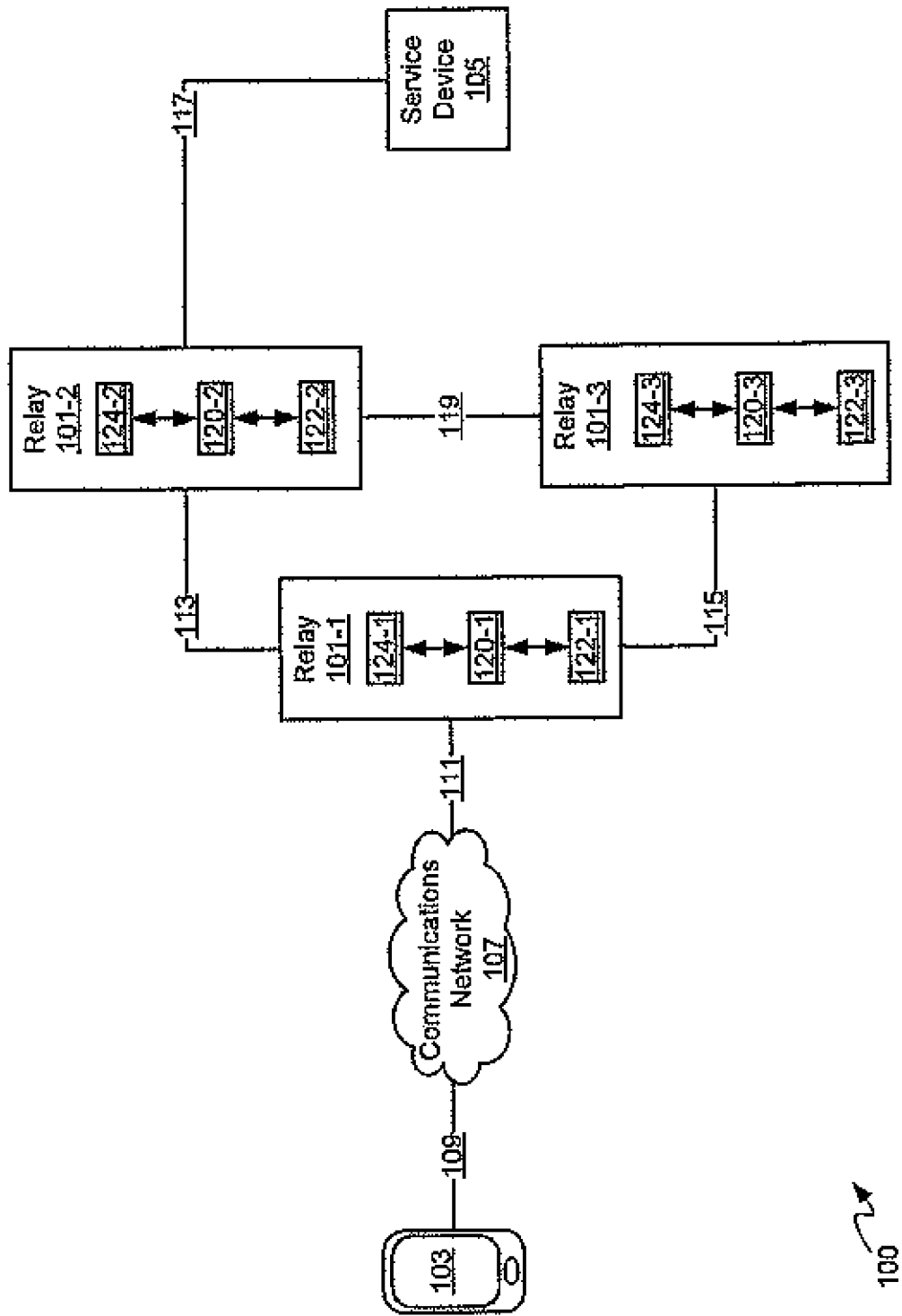
FIG. 1 depicts a system with efficient service roaming handling, according to non-limiting implementations.

An aspect of the specification provides a relay device comprising: a processor; a communication interface for communicating with at least a first relay and a second relay, the first relay for relaying messages to a service device; and, a plurality of connection objects, including at least a first connection object for relaying first messages to the first relay and a second connection object for relaying second messages to the second relay, the processor enabled to: receive a service roaming indication that the service device has roamed from the first relay to the second relay; and, in response, communicate only with the first connection object to reroute the first messages associated with the service device to the second relay.

The plurality of connection objects can further include a third connection object for receiving third messages from the first relay, the third messages including service messages, from the service device, intended to cause a communications device to connect with the service device via the first relay, the processor further enabled to, in response to receiving the service roaming indication, communicate only with the first connection object and the third connection object to reroute the first messages associated with the service device to the second relay and delete the service messages.

The relay device can further comprise one or more of a router and a switch.

A further aspect of the specification provides a relay system comprising: a service device; a first relay; a second relay in communication with the first relay and the service device, the second relay enabled to relay messages to the service device; and, a third relay in communication with at least the first relay, the first relay comprising: a processor; a communication interface for communicating with at least the second relay and the third relay; and, a plurality of connection objects, including at least a first connection object for relaying first messages to the second relay and a second connection object for relaying second messages to the third relay, the processor enabled to: receive a service roaming indication that the service device has roamed from the second relay to the third relay; and, in response, communicate only with the first connection object to reroute the first messages associated with the service device to the third relay.

The plurality of connection objects at the first relay can further include a third connection object for receiving third messages from the second relay, the third messages including service messages, from the service device, intended to cause a communications device to connect with the service device via the second relay, the processor further enabled to, in response to receiving the service roaming indication, communicate only with the first connection object and the third connection object to reroute first messages associated with the service device to the third relay and delete the service messages.

The second relay can comprise: a respective processor; a respective communication interface for communicating with at least the first relay and the service device; and, a plurality of respective connection objects, including at least inbound connection objects for receiving service messages from other relays, including at least the first relay, the respective processor enabled to: receive the service roaming indication; and, in response, take no action associated with the inbound connection objects.

The third relay can comprise: a respective processor; a respective communication interface for communicating with at least the first relay, the second connection object and the service device when the service device roams to the third relay; and, a plurality of respective connection objects, including at least a first respective connection object for relaying respective first messages to the second relay, the respective processor enabled to: determine that the respective communication interface is in communication with the service device; and, in response, communicate only with the first respective connection object to reroute the respective first messages, associated with the service device, to the service device. The plurality of respective connection objects at the third relay further includes a second respective connection object for receiving respective second messages from the second relay, the third messages including service messages, from the service device, intended to cause a communications device to connect with the service device via the second relay, the respective processor further enabled to communicate only with the first respective connection object and the second respective connection object to reroute first respective messages to the service device and delete the service messages.

Each of the first relay, the second relay and the third relay can further comprise one or more of a respective router and a respective switch.

Yet a further aspect of the specification provides a method comprising: receiving a service roaming indication at a first relay, that a service device has roamed from a second relay to a third relay, the first device comprising: a processor; a communication interface for communicating with at least the second relay and the third relay, the second relay for relaying messages to the service device; and, a plurality of connection objects, including at least a first connection object for relaying first messages to the second relay and a second connection object for relaying second messages to the third relay; and, in response, the processor communicating only with the first connection object to reroute the first messages associated with the service device to the third relay.

The method can further comprise: in response to receiving the service roaming indication at the first relay, the processor communicating only with the first connection object and a third connection object to reroute the first messages associated with the service device to the third relay and delete the service messages, wherein the plurality of connection objects further includes the third connection object for receiving the third messages from the second relay, the third messages including the service messages, from the service device, intended to cause a communications device to connect with the service device via the second relay.

The method can further comprise: receiving the service roaming indication at the second relay; and, in response, take no action, at the second relay, associated with inbound connection objects, wherein the second relay comprises: a respective processor; a respective communication interface for communicating with at least the first relay and the service device; and, a plurality of respective connection objects, including at least the inbound connection objects for receiving service messages from other relays, including at least the first relay.

The method can further comprise: determining, at the third relay, that a respective communication interface is in communication with the service device; and, in response, a respective processor communicating only with a first respective connection object to reroute respective first messages, associated with the service device, to the service device, the third relay comprising: the respective processor; a respective communication interface for communicating with at least the service device when the service device roams to the third relay; and, a plurality of respective connection objects, including at least the first respective connection object for relaying respective first messages to the second relay.

The method can further comprise: the respective processor communicating only with the first respective connection object and a second respective connection object to reroute first respective messages to the service device and delete the service messages, wherein the plurality of respective connection objects at the third relay further includes the second respective connection object for receiving respective second messages from the second relay, the third messages including the service messages, from the service device, intended to cause a communications device to connect with the service device via the second relay.

Another aspect of the specification provides a computer program product, comprising a computer usable medium having a computer readable program code adapted to be executed to implement a method comprising: receiving a service roaming indication at a first relay, that a service device has roamed from a second relay to a third relay, the first device comprising: a processor; a communication interface for communicating with at least the second relay and the third relay, the second relay for relaying messages to the service device; and, a plurality of connection objects, including at least a first connection object for relaying first messages to the second relay and a second connection object for relaying second messages to the third relay; and, in response, the processor communicating only with the first connection object to reroute the first messages associated with the service device to the third relay. The computer program product can comprise a non-transitory computer program product.

The method can further comprise: in response to receiving the service roaming indication at the first relay, the processor communicating only with the first connection object and a third connection object to reroute the first messages associated with the service device to the third relay and delete the service messages, wherein the plurality of connection objects further includes the third connection object for receiving the third messages from the second relay, the third messages including the service messages, from the service device, intended to cause a communications device to connect with the service device via the second relay.

The method can further comprise: receiving the service roaming indication at the second relay; and, in response, take no action, at the second relay, associated with inbound connection objects, wherein the second relay comprises: a respective processor; a respective communication interface for communicating with at least the first relay and the service device; and, a plurality of respective connection objects, including at least the inbound connection objects for receiving service messages from other relays, including at least the first relay.

The method can further comprise: determining, at the third relay, that a respective communication interface is in communication with the service device; and, in response, a respective processor communicating only with a first respective connection object to reroute respective first messages, associated with the service device, to the service device, the third relay comprising: the respective processor; a respective communication interface for communicating with at least the service device when the service device roams to the third relay; and, a plurality of respective connection objects, including at least the first respective connection object for relaying respective first messages to the second relay. The method can further comprise: the respective processor communicating only with the first respective connection object and a second respective connection object to reroute first respective messages to the service device and delete the service messages, wherein the plurality of respective connection objects at the third relay further includes the second respective connection object for receiving respective second messages from the second relay, the third messages including the service messages, from the service device, intended to cause a communications device to connect with the service device via the second relay.

FIG. 1 depicts a system 100 comprising a first relay 101-1, a second relay 101-2, a third relay 101-3, a communication device 103, and a service device 105, relay 101-1 and communication device 103 in communication with a communication network 107, according to non-limiting implementations. Relays 101-1, 101-2, 101-3 will interchangeably be referred to hereafter, collectively, as relays 101 and generically as a relay 101. Communications device 105 will be interchangeably referred to hereafter as device 105. Communications network 107 will be interchangeably referred to hereafter as network 107. It is yet further appreciated that communication device 103 is in communication with network 107 via a link 109, relay 101-1 is in communication with network 107, and relays 101-2, 101-3 via respective links 111, 113, 115, and relay 101-2 is initially in communication with service device 105 via a link 117. While optional, in depicted implementations, relays 101-2, 101-3 are in communication via a link 119.

Each relay 101 comprises a respective processor 120-1, 120-2, 120-3, interconnected with a respective memory 122-1, 122-2, 122-3 and a respective communication interface 124-1, 124-2, 124-3. Processors 120-1, 120-2, 120-3 will interchangeably be referred to hereafter collectively as processors 120 and generically as a processor 120. Memories 122-1, 122-2, 122-3 will interchangeably be referred to hereafter collectively as memories 122 and generically as a memory 122. Communication interfaces 124-1, 124-2, 124-3 will interchangeably be referred to hereafter collectively as interfaces 124 and generically as an interface 124.

It is further appreciated that system 100 can comprise any suitable number of devices similar to device 103, including hundreds to millions of devices. For example, system 100 can comprise handheld devices that are associated with accounts managed by an entity that operates at least a portion of network 107. For example, a user of device 103 can subscribe to services provided by the entity. As such, the entity can comprise a carrier operating at least a portion of network 107. As carriers are generally enabled to provide services to hundreds of thousands and even millions of subscribers, the number of devices in system 100 can be commensurate with a number of devices operated by a carrier.

Service device 105 generally comprises a device enabled to provide a service to device 103, and other similar devices in system 100, including, but not limited to, a message service, an email service, a text message service, an internet browsing service and the like. For example, service device 105 can comprise one or more of a message server, an email server, a text message server, an internet server, a proxy server and the like.

It is further appreciated that relays 101 are generally enabled to relay messages between device 103 and service device 105. For example, device 103 can transmit messages to service device 105 when using a service associated with service device 105, including, but not limited to messages for forwarding onto another device, and internet browser requests. In turn, service device 105 can transmit messages to device 103, including, but not limited to messages received from other devices and service messages, which will be described in further detail below.

It is yet further appreciated that system 100 can comprise any suitable number of relays similar to relays 101, for example in regional, national, and worldwide networks; indeed, when system 100 comprises a worldwide network of relays, a number of relays 101 can be large (e.g. thousands, hundreds of thousands and the like).

Figure 2:
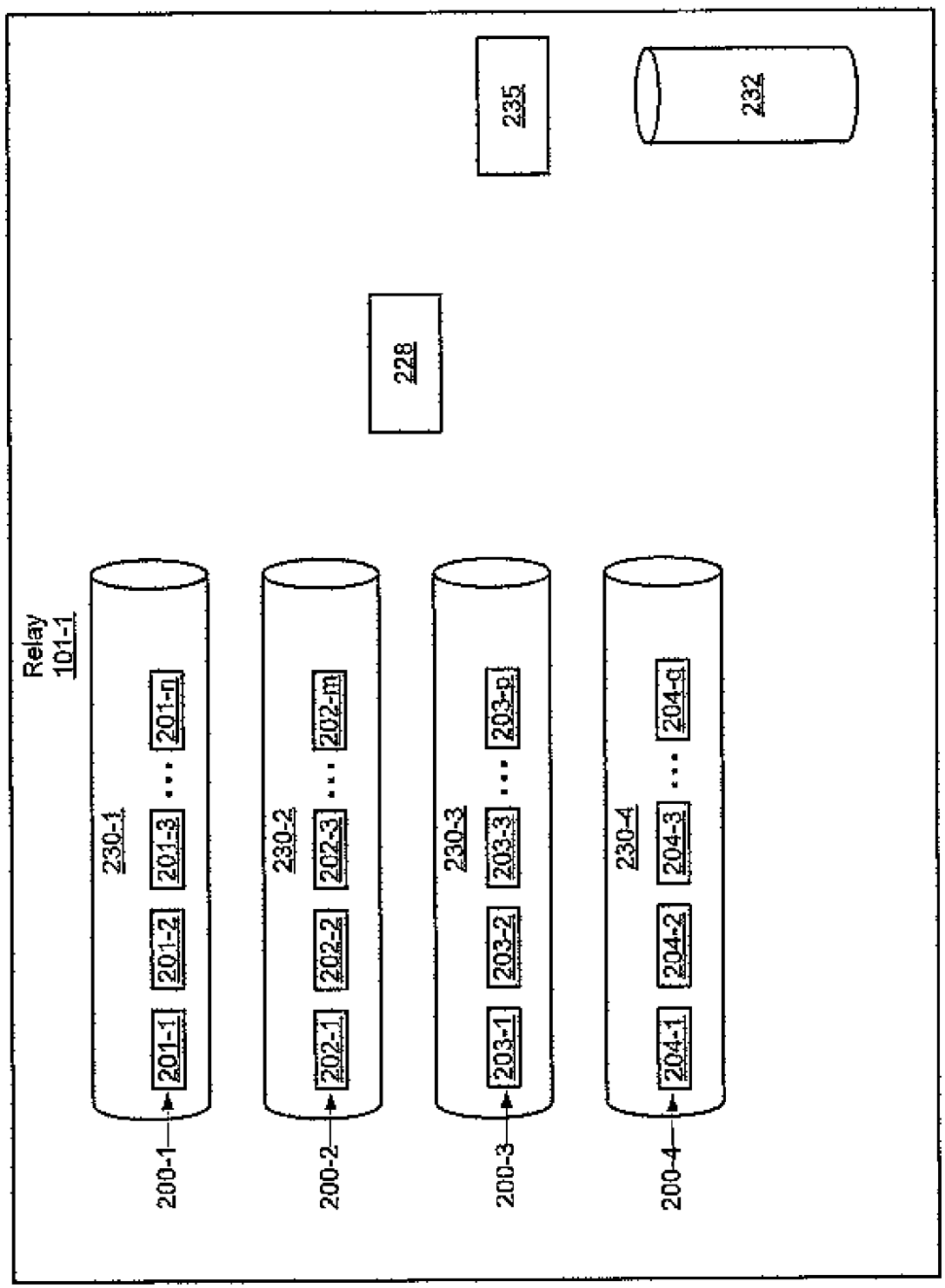
FIG. 2 depicts a schematic diagram of a first relay of the system of FIG. 1 showing elements related to relay processes, according to non-limiting implementations.

Attention is next directed to FIG. 2 which depicts a subset of elements of relay 101-1, but it is appreciated that all elements of relay 101-1 are nonetheless present. For example, while each relay 101 generally comprises a processor 120 interconnected with a memory 122 and a communications interface 124, they are not depicted in FIG. 2, but are nonetheless appreciated to be present: e.g. while processor 120-1 is not depicted at relay 101-1, it is nonetheless appreciated that processor 120-1 is present. Specifically, FIG. 2 provides a schematic diagram of relay 101-1 showing elements related to relay processes: a relay manager 228, connection objects 230-1, 230-2, 230-3, 230-4 and a routing table 232. Connection objects 230-1, 230-2, 230-3, 230-4 will interchangeably be referred to hereafter collectively as connection objects 230 and generically as a connection object 230.

In any event, processor 120-1 is generally enabled to operate relay manager 228 for managing connection objects 230. Furthermore memory 122-1 stores a routing table 232 for storing associations between connection objects 230 and relays 101-2, 101-3. For example: connection object 230-1 comprises a queue 200-1 of outbound messages 201-1, 201-2, 201-3 . . . 201-$n$ to be transmitted to relay 101-2 received from other relays 101 and/or from device 103 or other similar devices and/or from service device 105; connection object 230-2 comprises a queue 200-2 of inbound messages 202-1, 202-2, 202-3 . . . 202-$m$ received from relay 101-2 for relaying to other relays 101 and/or to device 103 or other similar devices and/or to service device 105; connection object 230-3 comprises a queue 200-3 of outbound messages 203-1, 203-3, 201-3 . . . 201-$p$ to be transmitted to relay 101-3 received from other relays 101 and/or from device 103 or other similar devices and/or from service device 105; and connection object 230-4 comprises a queue 200-4 of inbound messages 204-1, 204-2, 204-3 . . . 204-$q$ received from relay 101-3 for relaying to other relays 101 and/or to device 103 or other similar devices and/or to service device 105.

Queues 200-1, 200-2, 200-3 . . . 200-4 will interchangeably be referred to hereafter collectively as queues 200 and generically as a queue 200.

Messages 201-1, 201-2, 201-3 . . . 201-$n$ will interchangeably be referred to hereafter collectively as messages 201 and generically as a message 201.

Messages 202-1, 202-2, 202-3 . . . 202-$m$ will interchangeably be referred to hereafter collectively as messages 202 and generically as a message 202.

Messages 203-1, 203-2, 203-3 . . . 203-$p$ will interchangeably be referred to hereafter collectively as messages 203 and generically as a message 203.

Messages 204-1, 204-2, 204-3 . . . 204-$q$ will interchangeably be referred to hereafter collectively as messages 204 and generically as a message 204.

It is yet further appreciated that processor 120-1 provides relay manager 228 and connection objects 230 by processing an application 235 stored at memory 122-1; for example, application 235 can comprise an application for relaying messages and managing relaying of messages. Hence processor 120-1 processes application 235 to operate relay manager 228 and connection objects 230.

Further, relay manager 228 is generally enabled to manage which messages 201, 202, 203, 204 are in each queue 200, and further to enforce service roaming notifications, as described below. For example, relay manager 228 can further move inbound messages 202, 204 to an outbound connection object 230-1, 230-3: in other words, relay manager 228 can further manage relaying of messages received from one relay 101-2, 101-3 to another relay 101-2, 101-3 and/or to service device 105 and/or to device 103. Further, messages 201 received at relay 101-1 for relay to service device 105 are queued in connection object 230-1 for relay to relay 101-2 as routing table 232 stores data indicates that service device 105 is in communication with relay 101-2.

Indeed, it is further appreciated that not all connection objects 230 are depicted in FIG. 2, and relay 101-1 can comprise any suitable number of connection objects 230. For example, relay 101-1 can comprise more than one connection object 230 for exchanging messages with each of relays 101-2, 101-3. Further, relay 101-1 can be in communication with relays other than relays 101-2, 101-3, and hence, relay 101-1 can comprise connection objects 230 for exchanging messages with each of the other relays with which relay 101-1 is connected. Further, relay 101-1 can comprise at least one connection object 230 for exchanging messages with each network 107, including, but not limited to, an inbound connection object associated with network 107 and an outbound connection object associated with network 107.

Figure 3:
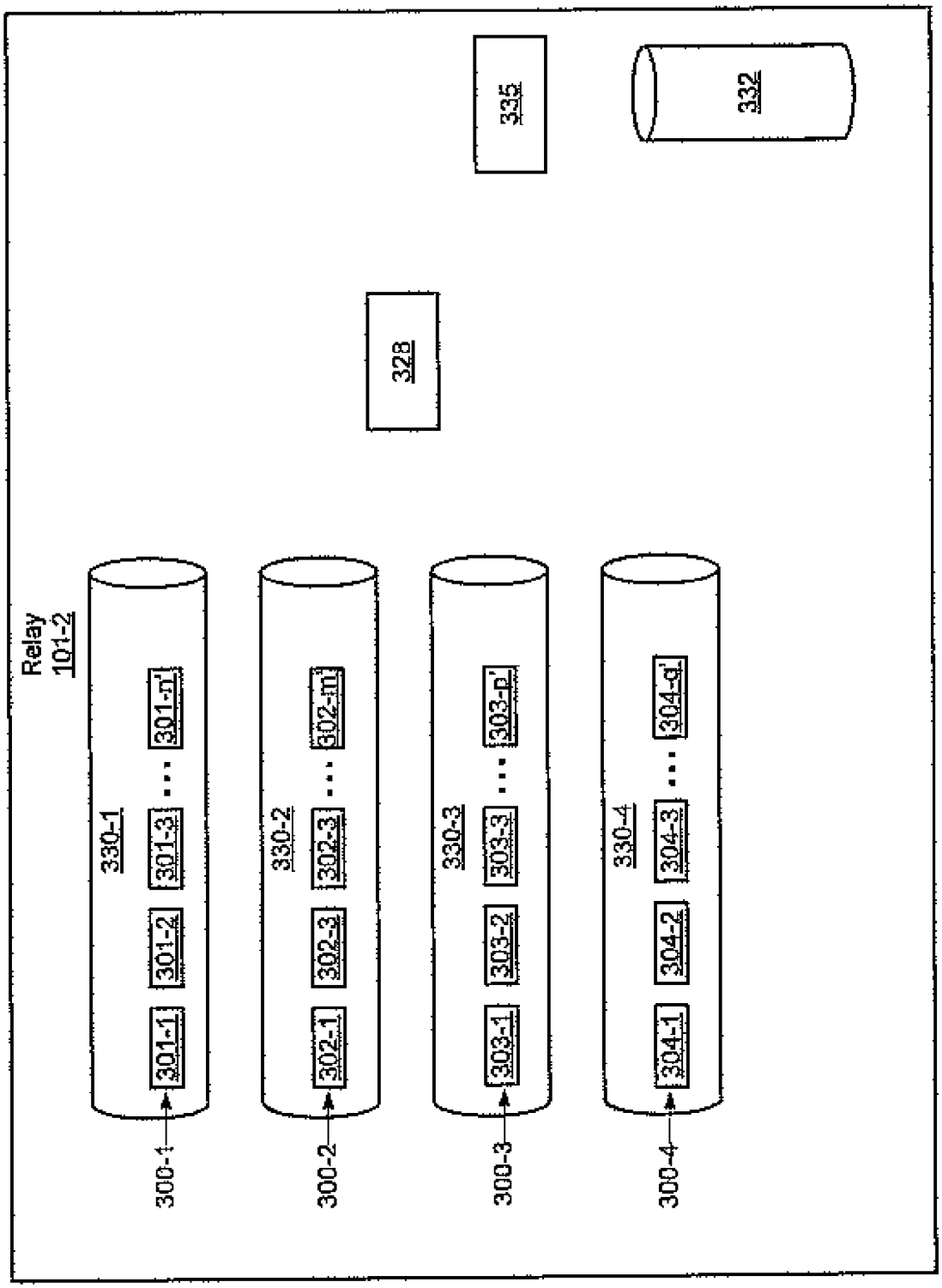
FIG. 3 depicts a schematic diagram of a second relay initially in communication with a service device of the system of FIG. 1 showing elements related to relay processes, according to non-limiting implementations.

Attention is next directed to FIG. 3 which depicts a subset of elements of relay 101-2, but it is appreciated that all elements of relay 101-2 are nonetheless present. For example, while processor 120-2 is not depicted at relay 101-2, it is nonetheless appreciated that processor 120-2 is present. Otherwise FIG. 3 is substantially similar to FIG. 2, with like elements having like numbers, but starting with a "3" rather than a "2", unless otherwise indicated. For example, queues 300-1, 300-2, 300-3, 300-4 are similar, respectively, to queues 200-1, 200-2, 200-3, 200-4.

Specifically, FIG. 3 provides a schematic diagram of relay 101-3 showing elements related to relay processes: a relay manager 328, connection objects 330-1, 330-2, 330-3, 330-4 and a routing table 332. Connection objects 330-1, 330-2, 330-3, 330-4 will interchangeably be referred to hereafter collectively as connection objects 330 and generically as a connection object 330.

In any event, processor 120-2 is generally enabled to operate relay manager 328 for managing connection objects 330. Furthermore memory 122-2 stores a routing table 332 for storing associations between connection objects 330 and relays 101-1, 101-3. For example: connection object 330-1 comprises a queue 300-1 of outbound messages 301-1, 301-2, 301-3 . . . 301-$n'$ to be transmitted to relay 101-1 received from other relays 101 and/or from device 103 or other similar devices and/or from service device 105; connection object 330-2 comprises a queue 300-2 of inbound messages 302-1, 302-2, 302-3 . . . 302-$m'$ received from relay 101-1 for relaying to other relays 101 and/or to device 103 or other similar devices and/or to service device 105; connection object 330-3 comprises a queue 300-3 of outbound messages 303-1, 303-2, 303-3 . . . 303-$p'$ to be transmitted to relay 101-3 received from other relays 101 and/or from device 103 or other similar devices and/or from service device 105; and connection object 330-4 comprises a queue 300-4 of inbound messages 304-1, 304-2, 304-3 . . . 304-$q'$ received from relay 101-3 for relaying to other relays 101 and/or to device 103 or other similar devices and/or to service device 105.

Queues 300-1, 300-2, 300-3 . . . 300-4 will interchangeably be referred to hereafter collectively as queues 300 and generically as a queue 300.

Messages 301-1, 301-2, 301-3 . . . 301-$n'$ will interchangeably be referred to hereafter collectively as messages 301 and generically as a message 301.

Messages 302-1, 302-2, 302-3 . . . 302-$m'$ will interchangeably be referred to hereafter collectively as messages 302 and generically as a message 302.

Messages 303-1, 303-3, 301-3 . . . 301-$p'$ will interchangeably be referred to hereafter collectively as messages 303 and generically as a message 303.

Messages 304-1, 304-2, 304-3 . . . 304-$q'$ will interchangeably be referred to hereafter collectively as messages 304 and generically as a message 304.

It is yet further appreciated that processor 120-2 provides relay manager 328 and connection objects 330 by processing an application 335 stored at memory 122-2; for example, application 335 can comprise an application for relaying messages and managing relaying of messages. Hence processor 120-2 processes application 335 to operate relay manager 328 and connection objects 330.

Further, relay manager 328 is generally enabled to manage which messages 301, 302, 303, 304 are in each queue 300, and further to enforce service roaming notifications, as described below. For example, relay manager 328 can further move inbound messages 302, 304 to an outbound connection object 330-1, 330-3: in other words, relay manager 328 can further manage relaying of messages received from one relay 101-1, 101-3 to another relay 101-1, 101-3 and/or to service device 105 and/or to device 103. Further, messages 301 received at relay 101-2 for relay to service device 105 are queued in a connection object (not depicted) associated with service device 105 as routing table 332 stores data indicates that service device 105 is in communication with relay 101-2.

Indeed, it is further appreciated that not all connection objects 330 are depicted in FIG. 3 and relay 101-2 can comprise any suitable number of connection objects 330. For example, relay 101-2 can comprise more than one connection object 330 for exchanging messages with each of relays 101-1, 101-3. Further, relay 101-2 can be in communication with relays other than relays 101-1, 101-3, and hence, relay 101-2 can comprise connection objects 330 for exchanging messages with each of the other relays with which relay 101-2 is connected. Further, relay 101-2 can comprise at least one connection object 330 for exchanging messages with service device 105, including, but not limited to, an inbound connection object associated with service device 105 and an outbound connection object associated with service device 105.

Figure 4:
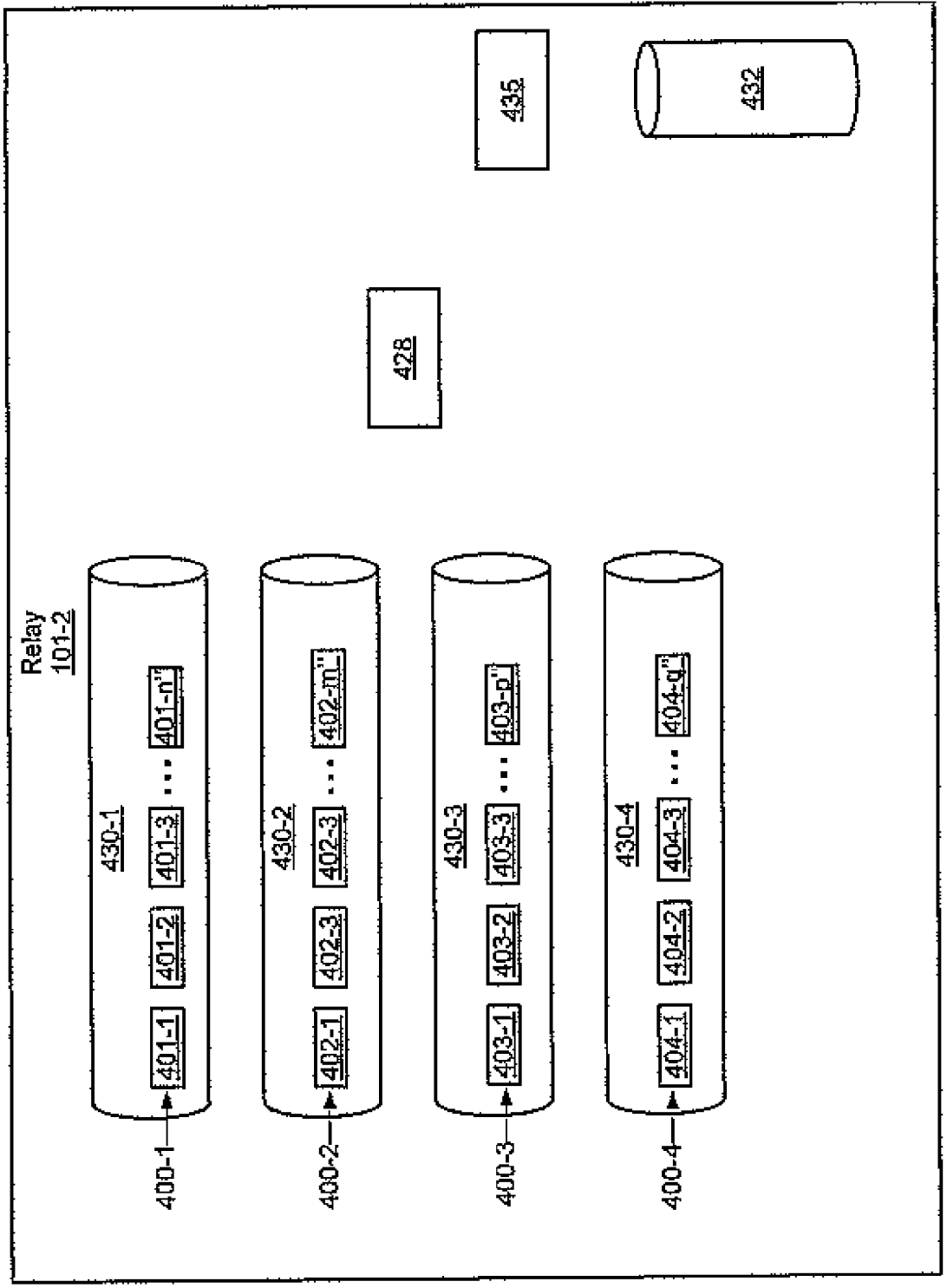
FIG. 4 depicts a schematic diagram of a third relay, to which service device roams, of the system of FIG. 1 showing elements related to relay processes, according to non-limiting implementations.

Attention is next directed to FIG. 4 which depicts a subset of elements of relay 101-3, but it is appreciated that all elements of relay 101-3 are nonetheless present. For example, while processor 120-3 is not depicted at relay 101-3, it is nonetheless appreciated that processor 120-3 is present. Otherwise FIG. 4 is substantially similar to FIG. 3, with like elements having like numbers, but starting with a "4" rather than a "3", unless otherwise indicated. For example, queues 400-1, 400-2, 400-3, 400-4 are similar, respectively, to queues 300-1, 300-2, 300-3, 300-4.

Specifically, FIG. 4 provides a schematic diagram of relay 101-3 showing elements related to relay processes: a relay manager 428, connection objects 430-1, 430-2, 430-3, 430-4 and a routing table 432. Connection objects 430-1, 430-2, 430-3, 430-4 will interchangeably be referred to hereafter collectively as connection objects 430 and generically as a connection object 430.

In any event, processor 120-3 is generally enabled to operate relay manager 428 for managing connection objects 430. Furthermore memory 122-3 stores a routing table 432 for storing associations between connection objects 430 and relays 101-1, 101-2. For example: connection object 430-1 comprises a queue 400-1 of outbound messages 401-1, 401-2, 401-3 . . . 401-$n''$ to be transmitted to relay 101-1 received from other relays 101 and/or from device 103 or other similar devices and/or from service device 105; connection object 430-2 comprises a queue 400-2 of inbound messages 402-1, 402-2, 402-3 . . . 402-$m''$ received from relay 101-1 for relaying to other relays 101 and/or to device 103 or other similar devices and/or to service device 105; connection object 430-3 comprises a queue 400-3 of outbound messages 403-1, 403-2, 403-3 . . . 403-$p$" to be transmitted to relay 101-2 received from other relays 101 and/or from device 103 or other similar devices and/or from service device 105; and connection object 430-4 comprises a queue 400-4 of inbound messages 404-1, 404-2, 404-3 . . . 404-$q$" received from relay 101-2 for relaying to other relays 101 and/or to device 103 or other similar devices and/or to service device 105.

Queues 400-1, 400-2, 400-3 . . . 400-4 will interchangeably be referred to hereafter collectively as queues 400 and generically as a queue 400.

Messages 401-1, 401-2, 401-3 . . . 401-$n$" will interchangeably be referred to hereafter collectively as messages 401 and generically as a message 401.

Messages 402-1, 402-2, 402-3 . . . 402-$m$" will interchangeably be referred to hereafter collectively as messages 402 and generically as a message 402.

Messages 403-1, 403-2, 403-3 . . . 403-$p$" will interchangeably be referred to hereafter collectively as messages 403 and generically as a message 403.

Messages 404-1, 404-2, 404-3 . . . 404-$q$" will interchangeably be referred to hereafter collectively as messages 404 and generically as a message 404.

It is yet further appreciated that processor 120-3 provides relay manager 428 and connection objects 430 by processing an application 435 stored at memory 122-3; for example, application 435 can comprise an application for relaying messages and managing relaying of messages. Hence processor 120-3 processes application 435 to operate relay manager 428 and connection objects 430.

Further, relay manager 428 is generally enabled to manage which messages 401, 402, 403, 404 are in each queue 400, and further to enforce service roaming notifications, as described below. For example, relay manager 428 can further move inbound messages 402, 404 to an outbound connection object 430-1, 430-3: in other words, relay manager 428 can further manage relaying of messages received from one relay 101-1, 101-2 to another relay 101-1, 101-2 and/or to service device 105 when service device 105 roams to relay 101-3 as described below, and/or to device 103. Further, messages 403 received at relay 101-3 for relay to service device 105 are queued in connection object 430-3 for relay to relay 101-2 as routing table 432 stores data indicates that service device 105 is in communication with service device 105.

Indeed, it is further appreciated that not all connection objects 430 are depicted in FIG. 4 and relay 101-3 can comprise any suitable number of connection objects 430. For example, relay 101-3 can comprise more than one connection object 430 for exchanging messages with each of relays 101-1, 101-2. Further, relay 101-3 can be in communication with relays other than relays 101-1, 101-2, and hence, relay 101-3 can comprise connection objects 430 for exchanging messages with each of the other relays with which relay 101-3 is connected. Further, relay 101-3 can comprise at least one connection object 430 for exchanging messages with service device 105 when service device 105 roams to relay 101-3 as described below, including, but not limited to, an inbound connection object associated with service device 105 and an outbound connection object associated with service device 105.

It is yet further appreciated that each connection objects 230, 330, 430 can comprise and/or be connected to respective TCP/IP (Transmission Control Protocol/Internet Protocol) connections and/or ports at each respective relay 101.

It is yet further appreciated that relay managers 228, 328, 428 and connection objects 230, 330, 430 can comprise one or more of hardware and software components. For example, logic for configuring relay managers 228, 328, 428 and connection objects 230, 330, 430 can be provided at respective applications 235, 335, 435, but each of connection objects 230, 330, 430 can further comprise at least a portion of one or more of respective processors 120 and respective interfaces 124.

It is yet further appreciated that, in some implementations, messages and/or data in system 100 can be propagated by hopping between relays 101. However, in other implementations, all relays 101 in system 100 are in communication with all other relays 101 in system 100, hence messages and/or data can be propagated between relays in a single hop respective to each relay 101.

It is further appreciated that elements of relays 101 described with reference to FIGS. 2-4 are not to be considered particularly limiting. For example, while a respective relay manager 228, 328, 428 is described with reference to each relay 101, in other implementations functionality of one or more relay managers 228, 328, 428 can be distributed between other elements of a respective relay 101, and indeed, each relay 101 need not have an element that performs all the functionality of the described relay managers 228, 328, 428.

It is yet further appreciated that each of relays 101 can generally be remote from one another.

Attention is next directed back to FIG. 1, and components of system 100 will be described hereafter.

Each of relays 101 can be any type of relay device and/or routing device and/or switching device that can be used to operate respective relay managers 228, 328, 428, and the like, and respective connection objects 230, 330, 430, and the like and maintain respective routing tables 232, 332, 432, as well as perform any other suitable functions for relaying respective messages. Each of relays 101 includes, but is not limited to, any suitable combination of communication devices, relay devices, routing devices, relay servers, routing servers, switches, switching devices and the like. Each of relays 101 can be based on any well-known relay and/or router environment including a module that houses one or more central processing units, volatile memory (e.g. random access memory), persistent memory (e.g. hard disk devices) and network interfaces to allow a relay 101 to communicate over respective links 111, 113, 115, 117 and the like. In some implementations, one or more of relays 101 can comprise one or more of a router and a switch.

Each of relays 101 can be any type of relay device and/or routing device and/or switching device that can be used to operate respective relay managers 228, 328, 428, and the like, and respective connection objects 230, 330, 430, and the like and maintain respective routing tables 232, 332, 432, as well as perform any other suitable functions for relaying respective messages. Each of relays 101 includes, but is not limited to, any suitable combination of communication devices, relay devices, routing devices, relay servers, routing servers, switches, switching devices and the like. Each of relays 101 can be based on any well-known relay and/or router environment including a module that houses one or more central processing units, volatile memory (e.g. random access memory), persistent memory (e.g. hard disk devices) and network interfaces to allow a relay 101 to communicate over respective links 111, 113, 115, 117, 119 and the like. In some implementations, one or more of relays 101 can comprise one or more of a router and a switch.

For example, each of relays 101 can comprise a suitable relay device and/or routing device and/or switching device running a suitable system, each of relays 101 comprising one or more central processing units (including but not limited to processors 120) random access memory (including but not limited to memories 122, each of which can comprise any suitable combination of volatile and non-volatile memory). However, it is to be emphasized that a vast array of computing environments for relay 101 are contemplated. It is further more appreciated that each of relays 101 can comprise any suitable number of relay devices and/or routing devices and/or switching devices.

Device 103 can be any type of electronic device that can be used in a self-contained manner. Device 103 can include, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations. Device 103 can be based on any well-known computing environment including a module that houses one or more central processing units, volatile memory (e.g. random access memory), persistent memory (e.g. hard disk devices, flash memory devices) and network interfaces to allow device 103 to communicate over link 109.

Further, device 103 can be associated with an account for which a given service can, in turn, be associated. For example, device 103 can be enabled to interact with network 107 for text messaging, email messaging, internet browsing and the like, and a subscriber associated with device 103 can pay the entity for providing coverage of device 103 via network 107 and/or for a given service associated with service device 105.

Each of links 109, 111, 113, 115, 117 comprises any suitable link for respectively enabling relays 101, device 103 and service device 105 to communicate with each other and with network 107. Links 109, 111, 113, 115, 117 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

It is appreciated that FIG. 1 further depicts a schematic diagram of each relay 101 according to non-limiting implementations. It should be emphasized that the structure of relay 101 in FIG. 1 is purely an example, and contemplates a device that can be to relay respective messages in system 100. However, while FIG. 1 contemplates relay device enabled to relay messages, in other implementations, each relay 101 can comprise a device enabled for both relaying messages and providing services: for example, relay 101 can both implement relay functionality and provide services similar to service devices 105.

Each respective processor 120 (which can be implemented as a plurality of processors, including but not limited to one or more central processors (CPUs)) is configured to communicate with each respective memory 122 comprising a respective non-volatile storage unit (e.g. Erasable Electronic Programmable Read Only Memory ("EEPROM"), Flash Memory) and a respective volatile storage unit (e.g. random access memory ("RAM")). Programming instructions that implement the functional teachings of relay 101 as described herein are typically maintained, persistently, in a respective memory 122 and used by respective processor 120 which makes appropriate utilization of respective volatile storage during the execution of such programming instructions. Those skilled in the art recognize that each memory 122 is an example of computer readable media that can store programming instructions executable on a respective processor 120. Furthermore, each memory 122 is also an example of a memory unit and/or memory module.

In particular, it is appreciated that each memory 122 stores respective applications 235, 335, 435 that, when processed by a respective processor 120, enables processor 120 to enforce service roaming changes as will be described below.

It is yet further appreciated that each application 235, 335, 435 is an example of programming instructions stored at a respective memory 122.

Each processor 120 also connects to a respective interface 124, each of which can be implemented as one or more connectors and/or network adaptors and/or radios, configured to communicate with network 107 and/or other relays 101 and/or service device 105 via respective links 111, 113, 115, 117. In general, it will be appreciated that each interface 124 is configured to correspond with the network architecture that is used to implement respective links 111, 113, 115, 117, as described above. In other implementations a plurality of links with different protocols can be employed at each relay 101 and thus a respective interface 124 can comprise a plurality of interfaces to support each type of respective link. In any event, it is appreciated that any suitable combination of interfaces is within the scope of present implementations.

It is yet further appreciated that: at relay 101-1, each of connection objects 230 receives and transmits messages via interface 124-1; at relay 101-2, each of connection objects 330 receives and transmits messages via interface 124-2; and at relay 101-3, each of connection objects 430 receives and transmits messages via interface 124-3.

Further, it should be understood that in general a wide variety of configurations for each relay 101 are contemplated.

It is yet further appreciated that service device 105 can comprise relay functionality as well as service functionality and can be similar, at least in part to one or more of relays 101, and hence comprises at least a respective processor, a respective communication interface and a respective memory, the respective processor for carrying out processing instructions stored at the respective memory to provide the functionality of service device 105.

Figure 5:
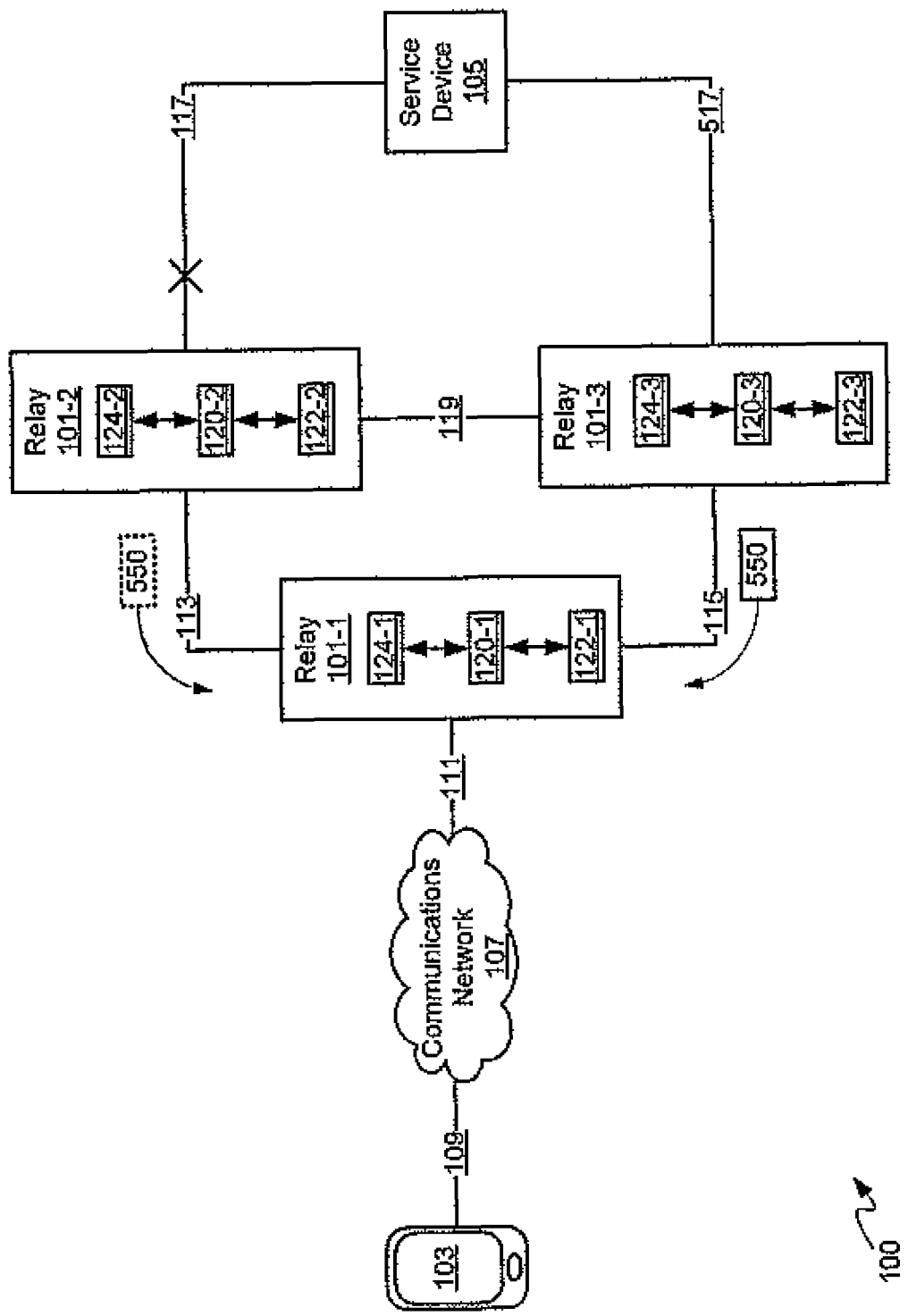
FIG. 5 depicts the system of FIG. 1 when the service device roams, according to non-limiting implementations.

Attention is next directed to FIG. 5, which is substantially similar to FIG. 1, with like elements having like numbers, however, in FIG. 5, service device 105 has roamed from relay 101-2 to relay 101-3. In other words, in FIG. 1, service device 105 is in communication with relay 101-2 via link 117 and in FIG. 5 service device 105 has stopped communicating with relay 101-2 and is communicating with relay 101-3 via a link 517, similar to link 117 as described above, but between relay 101-3 and service device 105.

Figure 7:
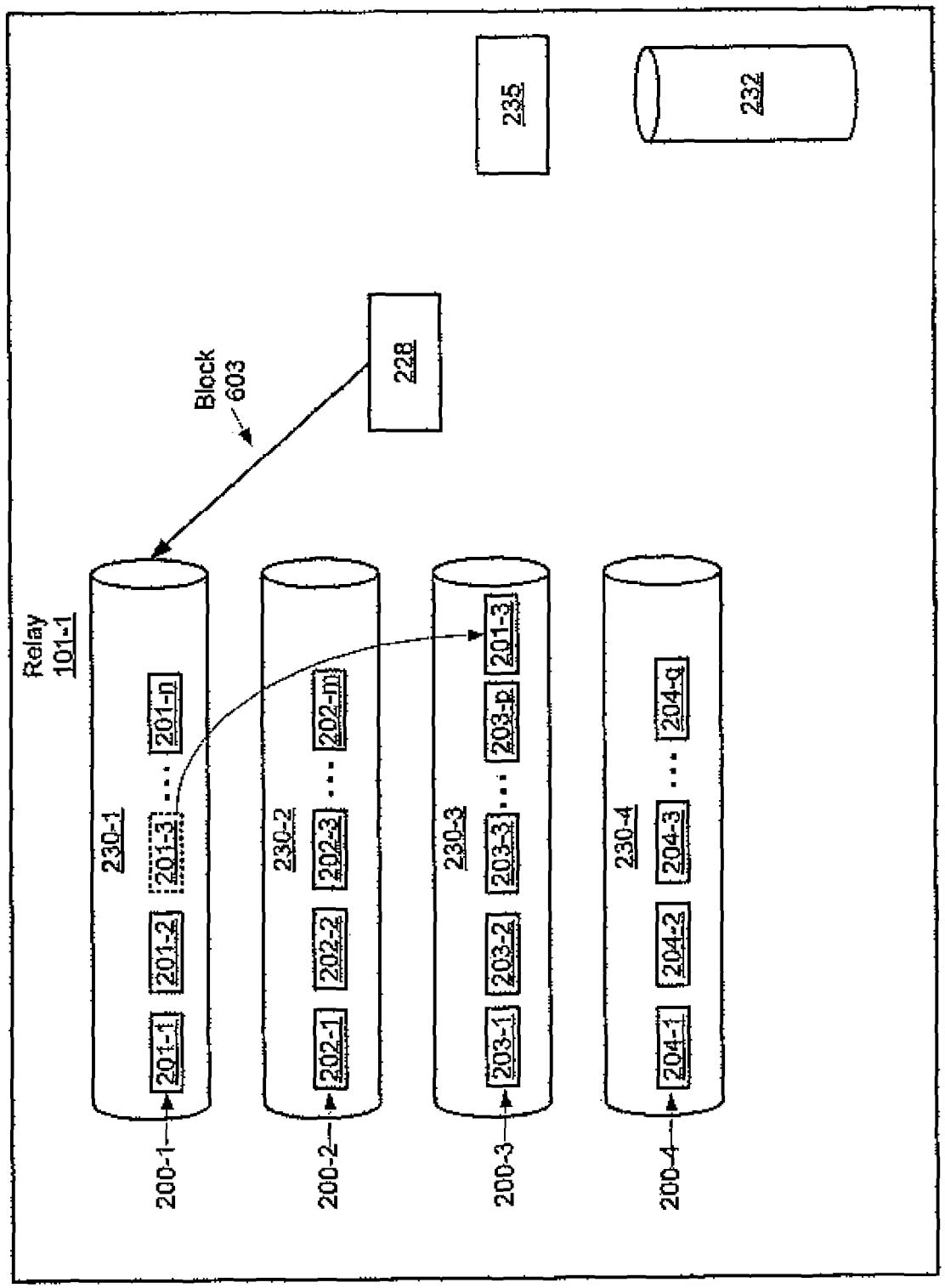
FIG. 7 depicts the relay of FIG. 2, showing communication only with an outbound connection object associated with the second relay, according to non-limiting implementations.

Such roaming can occur under various circumstances. In a non-limiting example, service device 105 can physically be moved from one geographic location proximate relay 101-2 to another geographic location proximate relay 101-3. In another non-limiting example, link 117 can fail and link 517 is provided as a back-up link to link 117. In yet another non-limiting example, service device 105 can fail and a back-up service device substantially similar to service device 105 is provided (i.e. in some implementations, in FIG. 7, service device 105 can be replaced with a similar back-up service device). In any event, the reasons for roaming are appreciated to be substantially non-limiting and any suitable process of service device 105 roaming from relay 101-2 to relay 101-3, whether as original service device 105 and/or as a back-up service device is within the scope of present implementations.

In any event, when service device 105 roams, relay 101-3 generates a service roaming indication 550 indicating that service device 105 has roamed from relay 101-2 to relay 101-3, indication 550 transmitted at least to relay 101-1 and relay 101-2, either directly and/or via another relay 101: for example, when indication is generated at relay 101-3, indication can be transmitted via link 115 to relay 101-1 and to relay 101-2; alternatively, indication 550 can be transmitted to relay 101-2 via link 119 for processing and then relayed to relay 101-1 via link 113.

Indication 550 can comprise any suitable format, but generally indicates to relay 101-1 that service device 105 is presently in communication with relay 101-3, hence messages 201 that were intended for transmission to relay 101-2 to be relayed to service device 105 should be rerouted to relay 101-3. Indication 550 can further cause routing table 232 to be updated accordingly.

Figure 6:
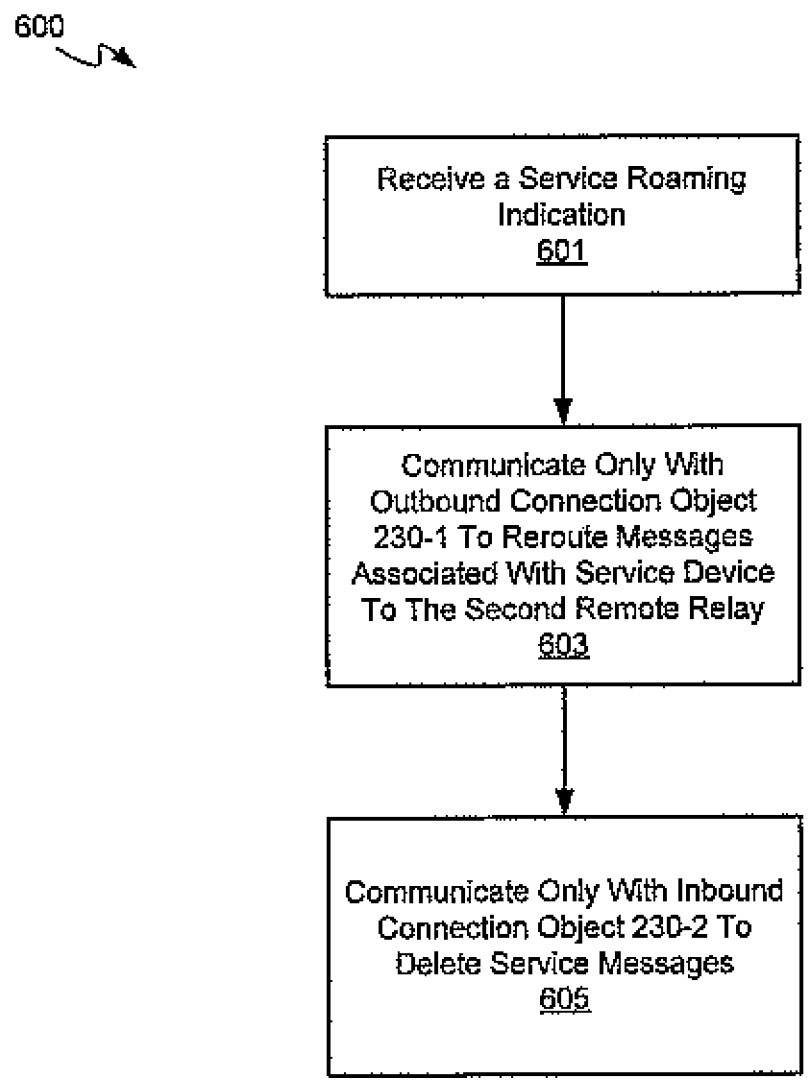
FIG. 6 depicts a flowchart of a method for efficient service roaming handling at the first relay of FIG. 2, according to non-limiting implementations.

Attention is now directed to FIG. 6 which depicts a flowchart of a method 600 for efficient service roaming handling, according to non-limiting implementations. In order to assist in the explanation of method 600, it will be assumed that method 600 is performed using system 100. Furthermore, the following discussion of method 600 will lead to a further understanding of system 100 and its various components. However, it is to be understood that system 100 and/or method 600 can be varied, and need not work exactly as discussed herein in conjunction with each other, and that such variations are within the scope of present implementations.

It is appreciated that, in some implementations, method 600 is implemented in system 100 by processor 120-1 of relay 101-1. Indeed, method 600 is one way in which relay 101-1 can be configured. It is to be emphasized, however, that method 600 need not be performed in the exact sequence as shown, unless otherwise indicated; and likewise various blocks may be performed in parallel rather than in sequence; hence the elements of method 600 are referred to herein as "blocks" rather than "steps". It is also to be understood, however, that method 600 can be implemented on variations of system 100 as well.

At block 601, relay 101-1 receives service roaming indication 550 as described above, indicating that service device 105 has roamed from relay 101-2 to relay 101-3.

At block 603, processor 120-1 communicates only with first connection object 230-1, in association with service roaming indication 550, to reroute first messages 201 associated with service device 105 to relay 101-3. For example, attention is directed to FIG. 7, which is substantially similar to FIG. 2 with like elements having like numbers. In these implementations, it is assumed that message 201-3 is intended for relay to service device 105: in other words all messages 201 are to be relayed to relay 101-2, as messages 201 are in queue 200-1 of connection object 230-1, which relays messages to relay 101-2. It is further appreciated that message 201-3 is for relay to service device 105 once relayed to relay 101-2. Hence message 201-3 is associated with a service provided by service device 105, as described above.

In any event, processor 120-1 communicates only with connection object 230-1, for example via relay manager 228, or the like, to causes message 201-3 to be rerouted to relay 101-3, resulting in message 201-3 being removed from queue 200-1 and placed in queue 200-3 of connection object 230-3. For example, relay manager 228 can cause the rerouting of message 201-3 by transmitting a message to connection object 230-1. No messages are transmitted to other connection objects 230-2, 230-3, 230-4 in rerouting of messages 201 associated with service device 105. In other words, one or more of processor 120-1 relay and manager 228 ignores other connection objects 230-2, 230-3, 230-4 in operations and/or actions associated with rerouting of messages associated with service device 105 when service roaming indication 550 is received.

Figure 8:
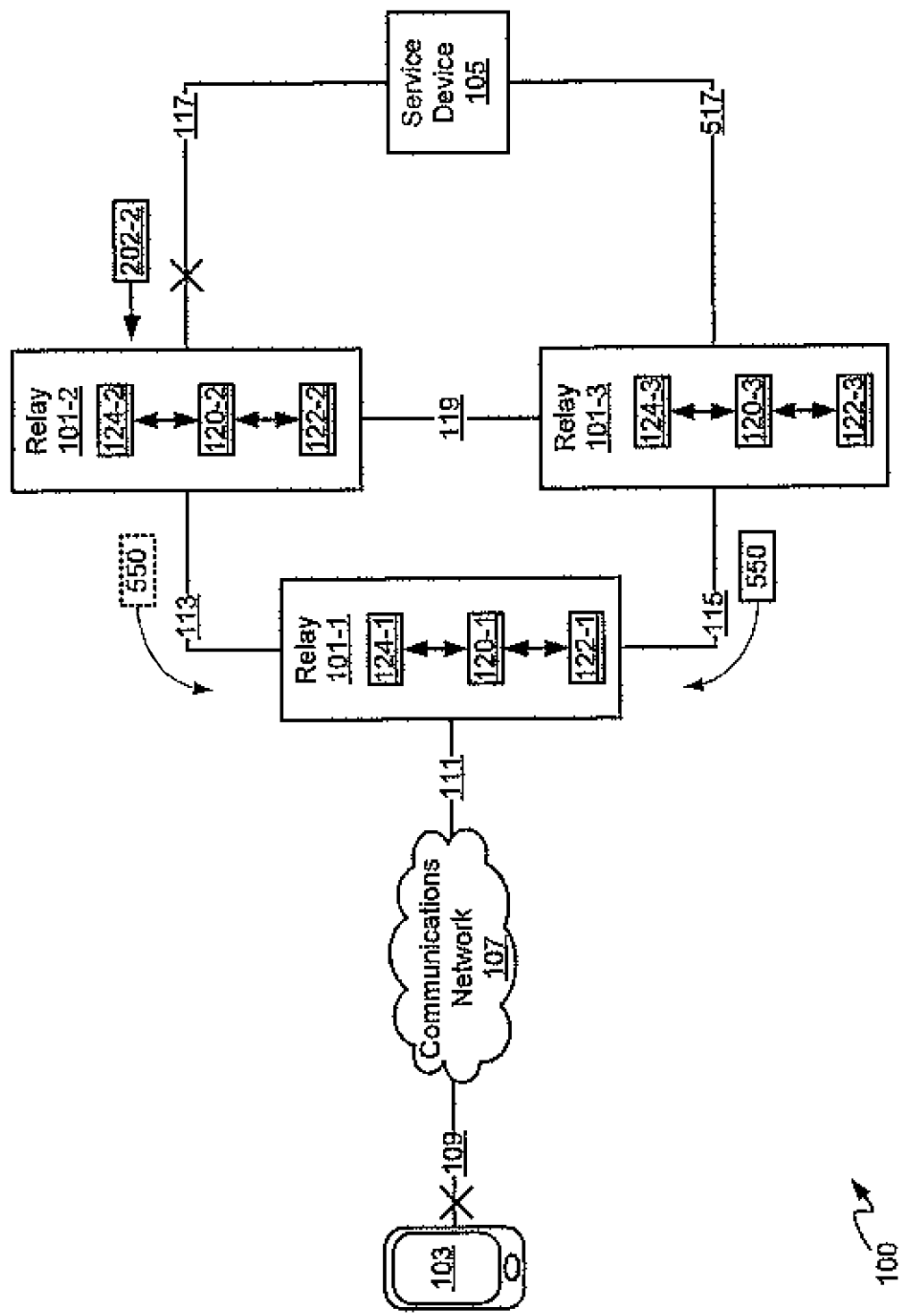
FIG. 8 depicts the system of FIG. 1 when the service device roams and a communication device goes out of coverage, according to non-limiting implementations.

In some implementations, inbound connection object 230-2 can comprise a message 202-2 received from service device 105 via relay 101-2, for forwarding to device 103. For example, consider the situation in FIG. 8, which is substantially similar to FIG. 5, with like elements having like numbers. In these implementations, link 109 is temporarily lost and/or severed such that device 103 is no longer in communication with network 107. For example, such situations can occur when device 103 is turned off, a communication interface at device 103 (including but not limited to a radio) for communicating with network 107 is turned off, and/or device 103 is transported out of coverage of network 107. It is further assumed that link 109 is lost and/or severed just prior to service device 105 roaming to relay 101-3. In any event, service device 105 can receive an indication that device 103 is no longer in coverage, for example from a network element of network 107; in response, service device 105 transmits a reconnect message 202-2 to relay 101-3, which in turn gets relayed to relay 101-1 and is queued in queue 200-2 of connection object 230-2 (i.e. an inbound connection object associated with relay 101-2).

When device 103 comes back into coverage of network 107 (i.e. device 103 is turned back on, the communication interface at device 103 is turned back on, and/or device 103 is transported back into coverage of network 107), in the absence of any action at relay 101-1 when service roaming indication 550 is received, message 202-2 would be forwarded to device 103. As message 202-2 is generally for causing device 103 to reconnect with service device 105 via relay 101-2, if message 202-2 were to be transmitted, then device 103 would erroneously try to reconnect with service device 105 via relay 101-2.

It is hence further appreciated that message 202-2 comprises a service message intended to cause device 103 to connect with service device 105 via relay 101-2.

Figure 9:
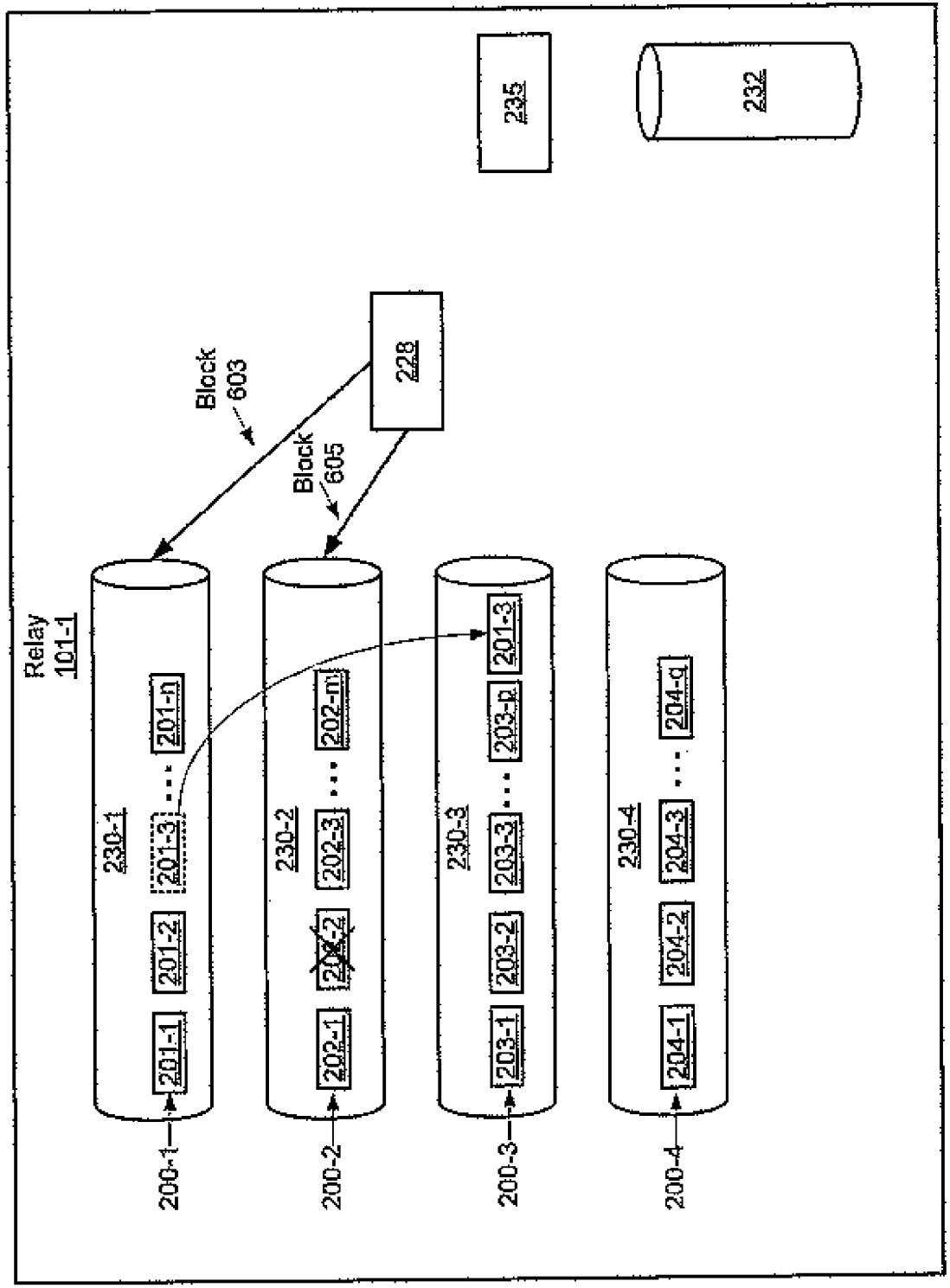
FIG. 9 depicts the second relay of FIG. 2, showing communication only with an outbound connection object and an inbound connection object associated with the second relay, according to non-limiting implementations.

In any event, attention is directed back to FIG. 6 and at block 605, processor 120-1 communicates only with connection object 230-2, in association with service roaming indication 550, to delete service messages intended to cause device 103, and/or any other device in network 107, to connect with service device 105 via relay 101-2. For example, attention is directed to FIG. 9, which is substantially similar to FIG. 7 with like elements having like numbers. In these implementations, it is assumed that message 202-2 comprises a service message as described above. Processor 120-1 causes message 202-2 to be deleted by communicating only with connection object 230-2 to delete service messages. For example, processor 120-1 can cause relay manager 228 to communicate only with connection object 230-1, for example via relay manager 228, or the like, to delete service messages associated with service device 105. Relay manager 228 can cause the deleting of message 202-2 by transmitting a message to connection object 230-2. No messages are transmitted to other connection objects 230-1, 230-3, 230-4 for deleting service messages. In other words, one or more of processor 120-1 relay and manager 228 ignores other connection objects 230-1, 230-3, 230-4 in operations and/or actions associated with deleting service messages when service roaming indication 550 is received.

It is yet further appreciated that while only one message 201-3 for rerouting and one service message 202-2 are described, system 100 can comprise any number of messages to be relayed to service device 105 for rerouting and any number of service messages associated with service device 105.

It is yet further appreciated that method 600 can be implemented in every other relay in system 100, other than relays 101-2, 101-3, to clean up messages associated with service device 105 when service device 105 roams. Cleaning up of messages associated with service device 105 at each of relays 101-2, 101-3 is described hereafter.

Figure 10:
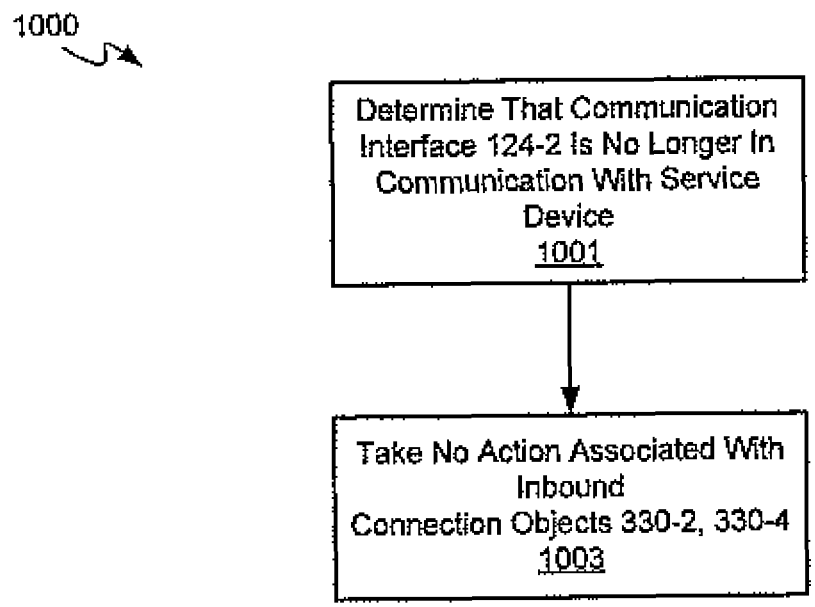
FIG. 10 depicts a flowchart of a method for efficient service roaming handling at the second relay of FIG. 3, according to non-limiting implementations.

Attention is now directed to FIG. 10 which depicts a flowchart of a method 1000 for efficient service roaming handling, according to non-limiting implementations. In order to assist in the explanation of method 1000, it will be assumed that method 1000 is performed using system 100. Furthermore, the following discussion of method 1000 will lead to a further understanding of system 100 and its various components. However, it is to be understood that system 100 and/or method 1000 can be varied, and need not work exactly as discussed herein in conjunction with each other, and that such variations are within the scope of present implementations.

It is appreciated that, in some implementations, method 1000 is implemented in system 100 by processor 120-2 of relay 101-2. Indeed, method 1000 is one way in which relay 101-2 can be configured. It is to be emphasized, however, that method 1000 need not be performed in the exact sequence as shown, unless otherwise indicated; and likewise various blocks may be performed in parallel rather than in sequence; hence the elements of method 1000 are referred to herein as "blocks" rather than "steps". It is also to be understood, however, that method 1000 can be implemented on variations of system 100 as well.

Indeed, it is further appreciated that method 1000 occurs when service device 105 roams from relay 101-2 to relay 101-3, as depicted in FIG. 5.

At block 1001, processor 120-2 receives indication 550, for example from relay 101-3 via link 119, as described above.

In response to block 1001, at block 1003, processor 120-2 takes no action associated with the inbound connection objects 330-2, 330-4 as there should be no messages coming from other relays 101 associated with service device 105 as, for example, block 603 of method 600 is being implemented at least at relay 101-1 to reroute such messages. This is in contrast to prior art relays where clean up jobs would be taken at all inbound connection objects regardless of whether there were any services messages or not. It is further appreciated that, while not depicted, processor 120-2 communicates with all outbound connections 330-1, 330-2 to delete all messages to device 103 from service device 105, including but not limited to service messages.

Figure 11:
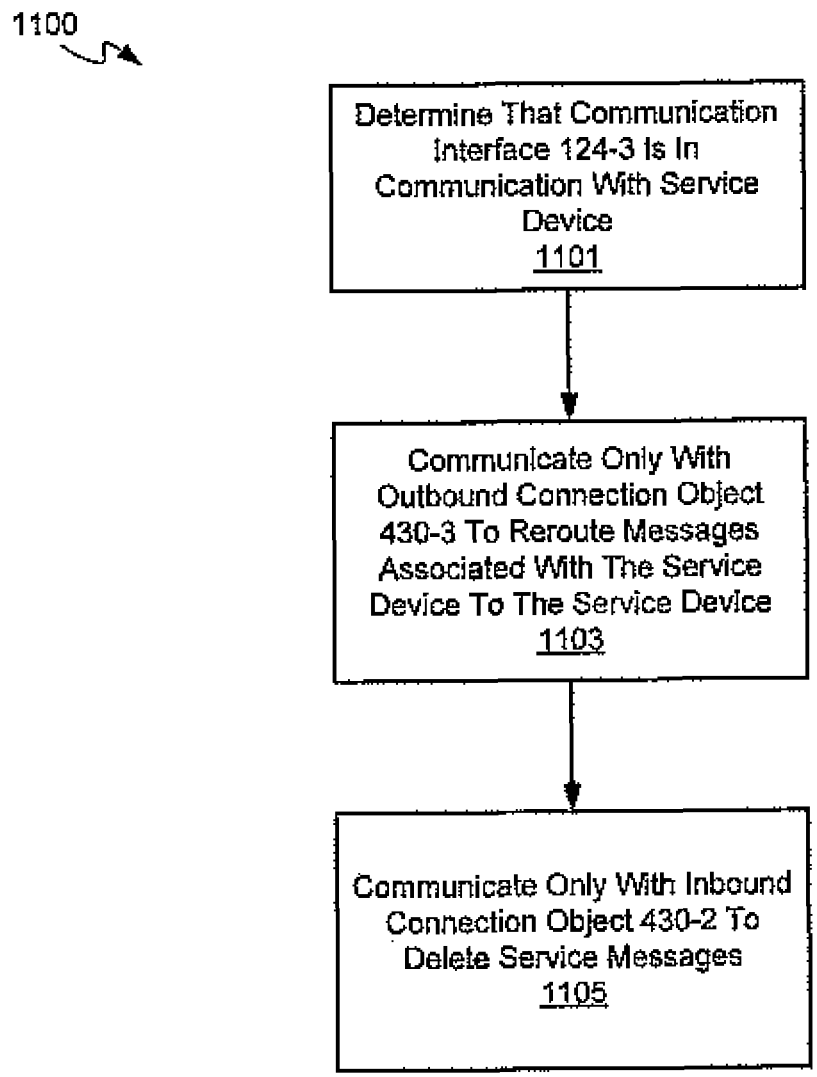
FIG. 11 depicts a flowchart of a method for efficient service roaming handling at the third relay of FIG. 4, according to non-limiting implementations.

Attention is now directed to FIG. 11 which depicts a flowchart of a method 1100 for efficient service roaming handling, according to non-limiting implementations. In order to assist in the explanation of method 1100, it will be assumed that method 1100 is performed using system 100. Furthermore, the following discussion of method 1100 will lead to a further understanding of system 100 and its various components. However, it is to be understood that system 100 and/or method 1100 can be varied, and need not work exactly as discussed herein in conjunction with each other, and that such variations are within the scope of present implementations.

It is appreciated that, in some implementations, method 1100 is implemented in system 100 by processor 120-3 of relay 101-3. Indeed, method 1100 is one way in which relay 101-3 can be configured. It is to be emphasized, however, that method 1100 need not be performed in the exact sequence as shown, unless otherwise indicated; and likewise various blocks may be performed in parallel rather than in sequence; hence the elements of method 1100 are referred to herein as "blocks" rather than "steps". It is also to be understood, however, that method 1100 can be implemented on variations of system 100 as well.

Indeed, it is further appreciated that method 1100 occurs when service device 105 roams from relay 101-2 to relay 101-3, as depicted in FIG. 5.

At block 1101, processor 120-3 determines that communication interface 124-3 is in communication with service device 105, for example by receiving messages from service device 105 to establish communications therewith and/or by establishing link 517.

At block 1103, processor 120-3 communicates only with connection object 430-1 to reroute first messages 401, associated with service device 105, to service device 105. It is appreciated that block 1103 is similar to block 603, however, rather than reroute messages intended for service device 105 to another relay 101, such messages are rerouted to service device 105.

Figure 12:
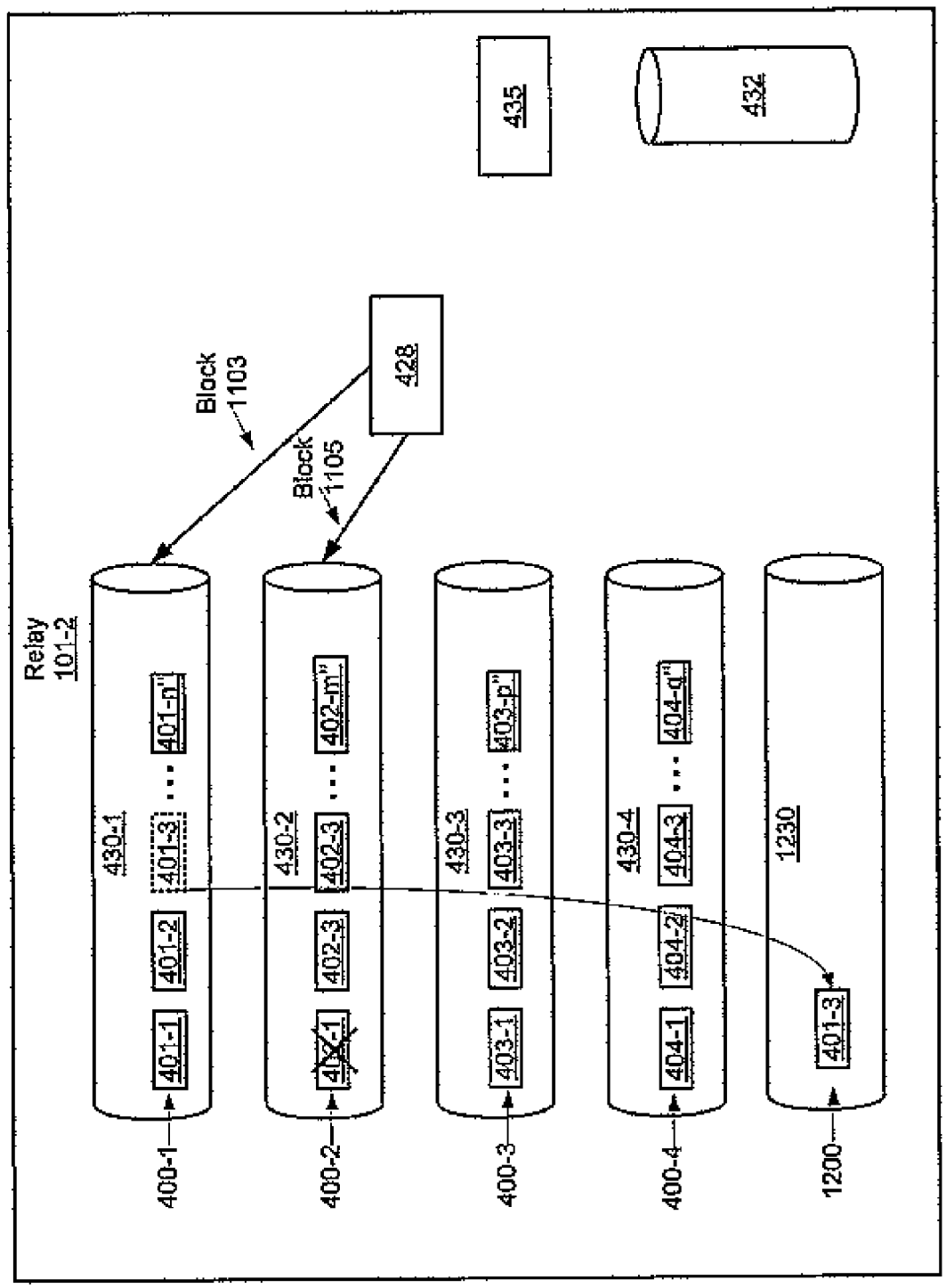
FIG. 12 depicts the third relay of FIG. 4, showing communication only with an outbound connection object and an inbound connection object associated with the third relay, according to non-limiting implementations.

For example, attention is directed to FIG. 12, which is substantially similar to FIG. 4 with like elements having like numbers. From FIG. 12, it is appreciated that, in these implementations, message 401-3 comprises a message, similar to message 201-3, to be relayed to relay 101-2 for further relay to service device 105. It is further appreciated that FIG. 12 further depicts an outbound connection object 1230, comprising a queue 1200, for queuing messages to be relayed to service device 105. Connection object 1230 can be provided by processor 120-3 in response to block 1101: for example processor 120-3 establishes a new TCP/IP connection with service device 105 and at least one connection object 1230 associated with service device 105; indeed, it is appreciated that while only one connection object 1230 is depicted, relays 101-3 can comprise at least one inbound connection object and at least one outbound connection object associated with service device 105.

In any event, in these implementations, at block 1103, processor 120-3 communicate only with connection object 430-1, for example via relay manager 428, or the like, to cause message 401-3 to be rerouted to service device 105, resulting in message 401-3 being removed from queue 400-1 and placed in queue 1200 of connection object 1230. For example, relay manager 428 can cause the rerouting of message 401-3 by transmitting a message to connection object 430-1. No messages are transmitted to other connection objects 430-2, 430-3, 430-4 in rerouting of messages 401 associated with service device 105. In other words, one or more of processor 120-3 relay and manager 428 ignores other connection objects 430-2, 430-3, 430-4 in operations and/or actions associated with rerouting of messages associated with service device 105 when service device 105 roams to relay 101-3.

In any event, attention is directed back to FIG. 12 and at block 1105, processor 120-3 communicates only with connection object 430-2 to delete service messages, as described above, intended to cause device 103, and/or any other device in system 100, to connect with service device 105 via relay 101-2. FIG. 12 hence assumes that device 103 has left coverage of network 107 and service device 105 transmits a reconnect message as described above with reference to FIG. 5.

For example, returning to FIG. 12, it is assumed that message 401-1 comprises a service message as described above. Processor 120-3 causes message 401-1 to be deleted by communicating only with connection object 430-2 to delete service messages. For example, processor 120-3 can cause relay manager 428 to communicate only with connection object 430-1, for example via relay manager 428, or the like, to delete service messages associated with service device 105. Relay manager 428 can cause the deleting of message 401-1 by transmitting a message to connection object 430-2. No messages are transmitted to other connection objects 430-1, 430-3, 430-4, 1230 for deleting service messages. In other words, one or more of processor 120-3 relay and manager 428 ignores other connection objects 430-1, 430-3, 430-4, 1230 in operations and/or actions associated with deleting service messages when it is determined that interface 124-3 is in communication with service device 105.

It is yet further appreciated that while only one message 401-3 for rerouting and one service message 401-1 are described in relation to FIGS. 11 and 12, system 100 can comprise any number of messages to be relayed to service device 105 for rerouting and any number of service messages associated with service device 105.

Figure 13:
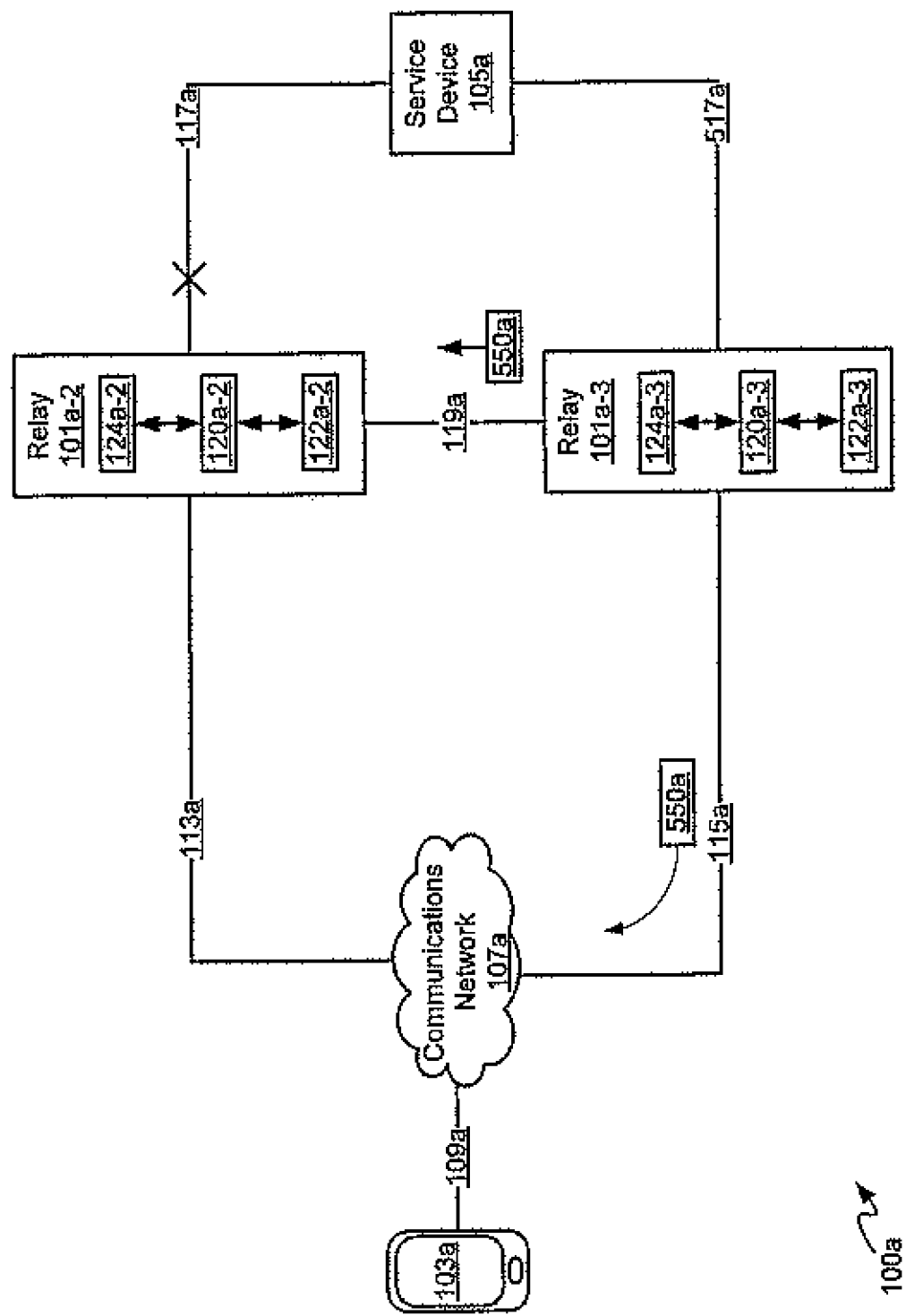
FIG. 13 depicts a system with efficient service roaming handling, according to non-limiting implementations.

Attention is next directed to FIG. 13 which depicts system 100a substantially similar to system 100 with like elements having like numbers, however with an "a" appended thereto. System 100a hence comprises relays 101a-2, 101a-3 (respectively comprising processors 120a-2, 120a-3, memories 122a-2, 122a-3, and interfaces 124a-2, 124a-3), a device 103a, a service device 105a, a network 107a, all in communication via links 109a, 113a, 115a, 117a. However, system 100a is lacking a relay similar to relay 101-1. In other words, one or both of relays 101a-2, 101a-3 are in communication with network 107a without an intervening relay there between. It is further appreciated that, while not depicted, each of relays 101a-2, 101a-3 further comprise respective connection objects respectively similar to connection objects 330, 430, and respective relay managers respectively similar to relay managers 328, 428. Further, service device 105a is initially in communication with relay 101a-2 via link 113a but then roams to relay 101a-3 via link 517a, similar system 100 as depicted in FIG. 5. Further, relay 101a-3 transmits indication 550a of the service roaming to relay 101a-2, via link 119a, indication 550a similar to indication 550a.

In any event, when service device 105a roams from relay 101a-2 to relay 101a-3, method 1000 is implemented at relay 101a-2 and method 1100 is implemented at relay 101a-3.

Hence, relay 101a-2 comprises: processor 120a-2; communication interface 120a-2 for communicating with relay 101a-3 and service device 105a; and, a plurality of respective connection objects, similar to connection object 330, including at least inbound connection objects for receiving service messages from other relays, including at least relay 101a-3. Further, processor 120a-2 implements method 1000 such that when service device 105a roams from relay 101a-2 to relay 101a-3: at block 1001, processor 120a-2 receives indication 550a, for example from relay 101a-3 via link 119a, as described above; and in response, at block 1003, processor 120-2 takes no action associated with inbound connection objects of relay 101a-2, in association with the service roaming indication 550a, as there should be no messages coming from other relay 101a-3 associated with service device 105a. This is in contrast to prior art relays where clean up jobs would be taken at all inbound connection objects regardless of whether there were any services messages or not. It is further appreciated that, while not depicted, processor 120a-2 communicates with all outbound connections at relay 101a-2 to delete all messages to device 103a from service device 105a, including but not limited to service messages.

Further, relay 101a-3 comprises: processor 120a-3; communication interface 124a-3 for communicating with relay 101a-2 and service device 105a when service device 105a roams to relay 101 a-3; and, a plurality of connection objects, similar to connection objects 430, including at least a first connection object for relaying messages to relay 101a-2. Further, processor 120a-3 implements method 1100 such that when service device 105a roams from relay 101 a-2 to relay 101 a-3: at block 1101, processor 120a-3 determines that communication interface 124a-3 is in communication with service device 105a, for example by receiving messages from service device 105a to establish communications therewith and/or by establishing link 517a; at block 1103, processor 120a-3 communicates only with an outbound connection object, in association with the service roaming indication 550a, the outbound connection object enabled to relay messages to relay 101a-2, to reroute messages, associated with service device 105a, to service device 105a; and, at block 1105, processor 120a-3 communicates only with an inbound connection object, in association with the service roaming indication 550a, the inbound connection object enabled to receive messages associated with relay 101a-2 430-2, to delete service messages, as described above, intended to cause device 103a, and/or any other device in system 100a, to connect with service device 105a via relay 101 a-2.

It is yet further appreciated that while in methods 600, 1000, 1100, processors 120, 120a and/or respective relay managers 228, 328, 428 are described communicating only with given connection objects, such communication that occurs only with the given connection in association with actions relayed to service roaming. However, respective processors 120, 120a and/or relay managers 228, 328, 428 can communicate with respective connection objects in association with other actions, including but not limited to actions not associated with the service roaming, relaying messages to devices 103, and the like.

In any event, by limiting communication with connection objects within each relay 101 when a service device roams, service roaming changes are handled more efficiently as communicating with all connection objects would generally be a waste of processing resources at each relay 101.

Those skilled in the art will appreciate that in some implementations, the functionality of relays 101 can be implemented using pre-programmed hardware or firmware elements (e.g., application specific integrated circuits (ASICs), electrically erasable programmable read-only memories (EEPROMs), etc.), or other related components. In other implementations, the functionality of relays 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A relay device comprising:
   a processor;
   a communication interface for communicating with at least a first relay and a second relay, the first relay for relaying messages to a service device; and,
   a plurality of connection objects, including at least a first connection object for relaying first messages to the first relay, a second connection object for relaying second messages to the second relay, and a third connection object for receiving third messages from the first relay, the third messages including service messages, from the service device, intended to cause a communications device to connect with the service device via the first relay,
   the processor enabled to:
      receive a service roaming indication that the service device has roamed from the first relay to the second relay; and, in response to receiving the service roaming indication:
      communicate only with the first connection object and the third connection object to reroute the first messages associated with the service device to the second relay, and delete the service messages.

2. The relay device of claim 1, further comprising one or more of a router and a switch.

3. A relay system comprising:
   a service device;
   a first relay;
   a second relay in communication with the first relay and the service device, the second relay enabled to relay messages to the service device; and,
   a third relay in communication with at least the first relay, the first relay comprising:
      a processor;
      a communication interface for communicating with at least the second relay and the third relay; and,
      a plurality of connection objects, including at least a first connection object for relaying first messages to the second relay, a second connection object for relaying second messages to the third relay, and a third connection object for receiving third messages from the second relay, the third messages including service messages, from the service device, intended to cause a communications device to connect with the service device via the second relay
      the processor enabled to:
         receive a service roaming indication that the service device has roamed from the second relay to the third relay; and, in response to receiving the service roaming indication:
         communicate only with the first connection object and the third connection object to reroute the first messages associated with the service device to the third relay and delete the service messages.

4. The relay system of claim 3, wherein the second relay comprises:
   a respective processor;
   a respective communication interface for communicating with at least the first relay and the service device; and,
   a plurality of respective connection objects, including at least inbound connection objects for receiving service messages from other relays, including at least the first relay,
   the respective processor enabled to:
      receive the service roaming indication; and, in response, take no action associated with the inbound connection objects.

5. The relay system of claim 3, wherein the third relay comprises:
   a respective processor;
   a respective communication interface for communicating with at least the first relay, the second connection object and the service device when the service device roams to the third relay; and,
   a plurality of respective connection objects, including at least a first respective connection object for relaying respective first messages to the second relay, the respective processor enabled to:
      determine that the respective communication interface is in communication with the service device; and, in response,
      communicate only with the first respective connection object to reroute the respective first messages, associated with the service device, to the service device.

6. The relay system of claim 5, wherein the plurality of respective connection objects at the third relay further includes a second respective connection object for receiving respective second messages from the second relay, the third messages including service messages, from the service device, intended to cause a communications device to connect with the service device via the second relay, the respective processor further enabled to communicate only with the first respective connection object and the second respective connection object to reroute first respective messages to the service device and delete the service messages.

7. The relay system of claim 3, wherein each of the first relay, the second relay and the third relay further comprises one or more of a respective router and a respective switch.

8. A method comprising:
   receiving a service roaming indication at a first relay, that a service device has roamed from a second relay to a third relay, the first device comprising: a processor; a communication interface for communicating with at least the second relay and the third relay, the second relay for relaying messages to the service device; and, a plurality of connection objects, including at least a first connection object for relaying first messages to the second relay and a second connection object for relaying second messages to the third relay; and, in response to receiving the service roaming indication at the first relay,
   the processor communicating only with the first connection object and a third connection object to reroute the first messages associated with the service device to the third relay and delete the service messages, wherein the plurality of connection objects further includes the third connection object for receiving the third messages from the second relay, the third messages including the service messages, from the service device, intended to cause a communications device to connect with the service device via the second relay.

9. The method of claim 8, further comprising:
receiving the service roaming indication at the second relay; and, in response,
take no action, at the second relay, associated with inbound connection objects, wherein the second relay comprises: a respective processor; a respective communication interface for communicating with at least the first relay and the service device; and, a plurality of respective connection objects, including at least the inbound connection objects for receiving service messages from other relays, including at least the first relay.

10. The method of claim 8, further comprising:
determining, at the third relay, that a respective communication interface is in communication with the service device; and, in response,
a respective processor communicating only with a first respective connection object to reroute respective first messages, associated with the service device, to the service device, the third relay comprising: the respective processor; a respective communication interface for communicating with at least the service device when the service device roams to the third relay; and, a plurality of respective connection objects, including at least the first respective connection object for relaying respective first messages to the second relay.

11. The method of claim 10, further comprising:
the respective processor communicating only with the first respective connection object and a second respective connection object to reroute first respective messages to the service device and delete the service messages, wherein the plurality of respective connection objects at the third relay further includes the second respective connection object for receiving respective second messages from the second relay, the third messages including the service messages, from the service device, intended to cause a communications device to connect with the service device via the second relay.

12. A non-transitory computer program product, comprising a computer usable medium having a computer readable program code adapted to be executed to implement a method comprising:
receiving a service roaming indication at a first relay, that a service device has roamed from a second relay to a third relay, the first device comprising: a processor; a communication interface for communicating with at least the second relay and the third relay, the second relay for relaying messages to the service device; and, a plurality of connection objects, including at least a first connection object for relaying first messages to the second relay and a second connection object for relaying second messages to the third relay; and, in response to receiving the service roaming indication at the first relay,
the processor communicating only with the first connection object and a third connection object to reroute the first messages associated with the service device to the third relay and delete the service messages, wherein the plurality of connection objects further includes the third connection object for receiving the third messages from the second relay, the third messages including the service messages, from the service device, intended to cause a communications device to connect with the service device via the second relay.

13. The non-transitory computer program product of claim 12, the method further comprising:
receiving the service roaming indication at the second relay; and, in response,
take no action, at the second relay, associated with inbound connection objects, wherein the second relay comprises: a respective processor; a respective communication interface for communicating with at least the first relay and the service device; and, a plurality of respective connection objects, including at least the inbound connection objects for receiving service messages from other relays, including at least the first relay.

14. The non-transitory computer program product of claim 12, the method further comprising:
determining, at the third relay, that a respective communication interface is in communication with the service device; and, in response,
a respective processor communicating only with a first respective connection object to reroute respective first messages, associated with the service device, to the service device, the third relay comprising: the respective processor; a respective communication interface for communicating with at least the service device when the service device roams to the third relay; and, a plurality of respective connection objects, including at least the first respective connection object for relaying respective first messages to the second relay.

15. The non-transitory computer program product of claim 14, the method further comprising:
the respective processor communicating only with the first respective connection object and a second respective connection object to reroute first respective messages to the service device and delete the service messages, wherein the plurality of respective connection objects at the third relay further includes the second respective connection object for receiving respective second messages from the second relay, the third messages including the service messages, from the service device, intended to cause a communications device to connect with the service device via the second relay.

* * * * *